US008065911B2

(12) United States Patent
Taylor et al.

(10) Patent No.: US 8,065,911 B2
(45) Date of Patent: Nov. 29, 2011

(54) VEHICLE TYRE CHECKING SYSTEM

(75) Inventors: Michael Taylor, Leafield (GB);
Christopher Berg, Stockenchurch (GB)

(73) Assignee: Wheelright Limted, Oxfordshire (GB)

( * ) Notice: Subject to any disclaimer, the term of this patent is extended or adjusted under 35 U.S.C. 154(b) by 975 days.

(21) Appl. No.: 11/630,593

(22) PCT Filed: Jul. 7, 2005

(86) PCT No.: PCT/GB2005/002696
§ 371 (c)(1),
(2), (4) Date: Dec. 26, 2007

(87) PCT Pub. No.: WO2006/003467
PCT Pub. Date: Jan. 12, 2006

(65) Prior Publication Data
US 2008/0209995 A1 Sep. 4, 2008

(30) Foreign Application Priority Data

Jul. 7, 2004 (GB) .................................... 0415258.3

(51) Int. Cl.
*G01M 17/02* (2006.01)
(52) U.S. Cl. .......................................................... 73/146
(58) Field of Classification Search ........................ None
See application file for complete search history.

(56) References Cited

U.S. PATENT DOCUMENTS 4,794,365 A   12/1988   Dunbar
(Continued)

FOREIGN PATENT DOCUMENTS
DE     19744076 A1    4/1999
(Continued)

OTHER PUBLICATIONS 3-page International Search Report for PCT/GB2005/002696.

*Primary Examiner* — Lisa Caputo
*Assistant Examiner* — Jermaine Jenkins
(74) *Attorney, Agent, or Firm* — Edwards Wildman Palmer LLP; Steven M. Jensen; Brian R. Landry

(57) ABSTRACT

A method and apparatus for assessing the tread on a vehicle tyre, measuring tyre pressure and calculating other parameters such as vehicle weight. The vehicle is driven in a longitudinal direction so that the tyre passes over a first lateral sensor (6) that extends across the footprint of the tyre, the first sensor comprising an array of individual force sensing elements (11), which provide outputs indicative of tyre pressure at points across the footprint of the tyre. The sensing elements are sampled at intervals as the tyre moves over them, so as to build up data relating to the entire footprint of the tyre. The sensing elements are of relatively high resolution to detect areas within the tyre footprint where there is tread cut into the tyre, so that the extent of tread coverage can be assessed. Tyre pressure is also determined. The tyre then passes over a series of second lateral sensors (7) spaced at intervals to assess the tyre around its circumference. The second lateral sensors may be of low resolution, with outputs being compared with each other and with a low resolution sensor (T) adjacent the high resolution sensor to assess whether there is a difference in tyre tread quality at different positions around the tyre circumference. At least one lateral sensor may be provided with resilient portions that extend into tyre tread portions. These will engage the base of a tread portion that is below a predetermined minimum tread depth, so as to increase the area of contact and provide an indication of insufficient tread depth.

22 Claims, 6 Drawing Sheets

U.S. PATENT DOCUMENTS

| | | | |
|---|---|---|---|
| 4,795,998 A | 1/1989 | Dunbar et al. | |
| 4,986,118 A | 1/1991 | Pottinger | |
| 5,260,520 A | 11/1993 | Muhs et al. | |
| 5,396,817 A | 3/1995 | Rosenweig et al. | |
| 5,445,020 A | 8/1995 | Rosensweig et al. | |
| 5,641,900 A | 6/1997 | Di Bernardo et al. | |
| 5,942,681 A | 8/1999 | Vollenweider et al. | |
| 6,161,431 A * | 12/2000 | Drahne et al. | 73/146 |
| 6,539,788 B1 * | 4/2003 | Mancosu et al. | 73/146 |
| 6,550,320 B1 * | 4/2003 | Giustino | 73/146 |
| 6,626,035 B1 | 9/2003 | Dent et al. | |
| 6,952,954 B2 * | 10/2005 | Liebemann et al. | 73/146 |
| 7,158,018 B2 * | 1/2007 | Schick | 340/442 |
| 7,343,789 B2 * | 3/2008 | Fujisawa et al. | 73/146 |

FOREIGN PATENT DOCUMENTS

| | | |
|---|---|---|
| DE | 19949337 A1 | 5/2001 |
| EP | 0469948 A1 | 2/1992 |
| EP | 0545641 | 6/1993 |
| EP | 0656269 | 6/1995 |
| EP | 0695935 A | 2/1996 |
| EP | 0997713 A1 | 5/2000 |
| GB | 2115556 A | 9/1983 |
| WO | WO 0011442 | 3/2000 |
| WO | 01/20284 A2 | 3/2001 |
| WO | WO 01/20284 A | 3/2001 |
| WO | 2004/013746 A2 | 2/2004 |
| WO | WO 2004/013746 A | 2/2004 |
| WO | 2004/057292 A1 | 7/2004 |
| WO | WO 2004/057292 | 7/2004 |

* cited by examiner

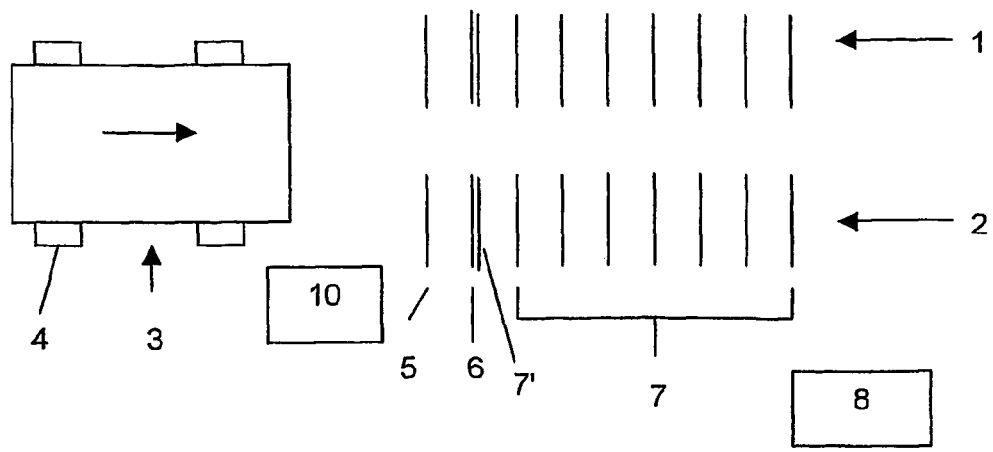
Figure 1
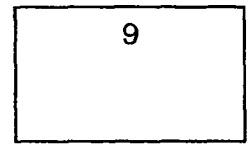
Figure 2
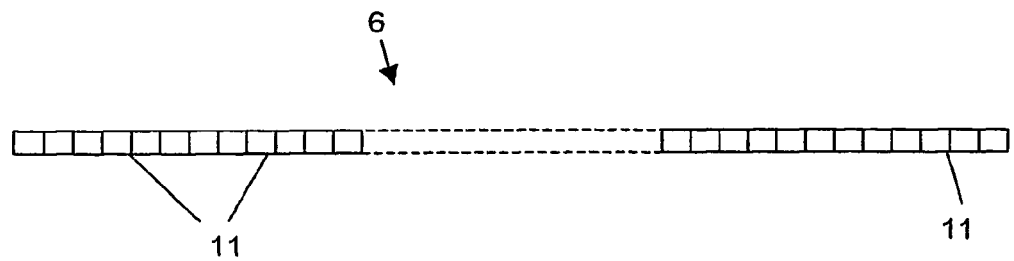
Figure 3
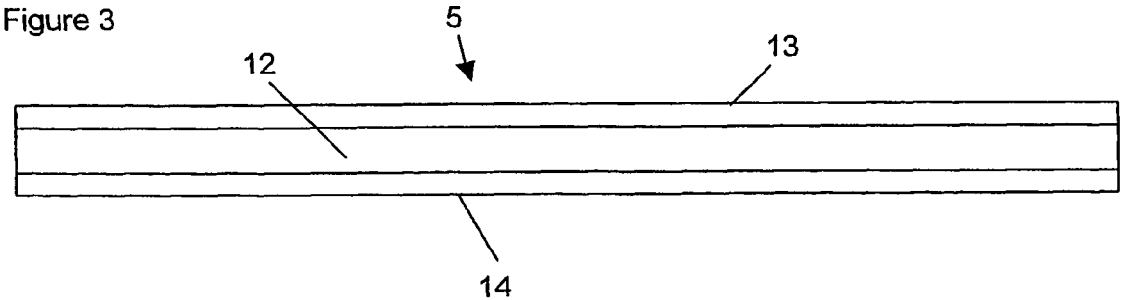

Figure 4
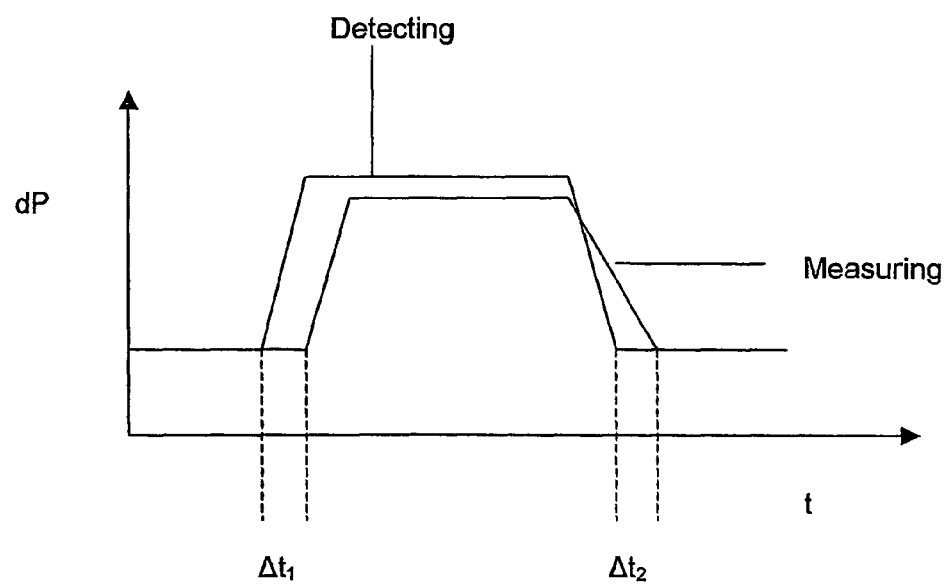
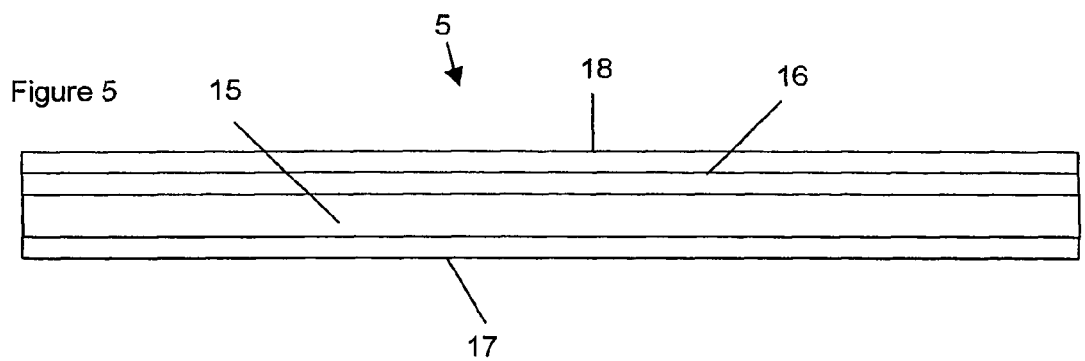
Figure 5
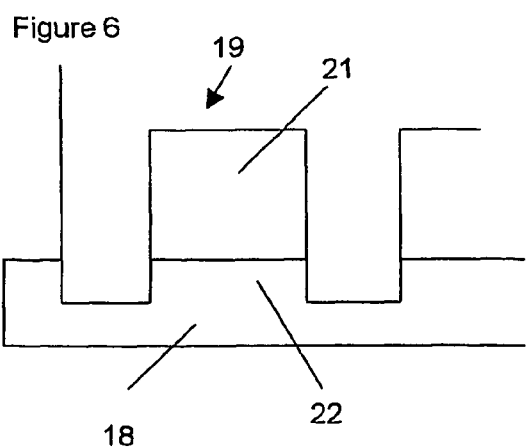
Figure 6
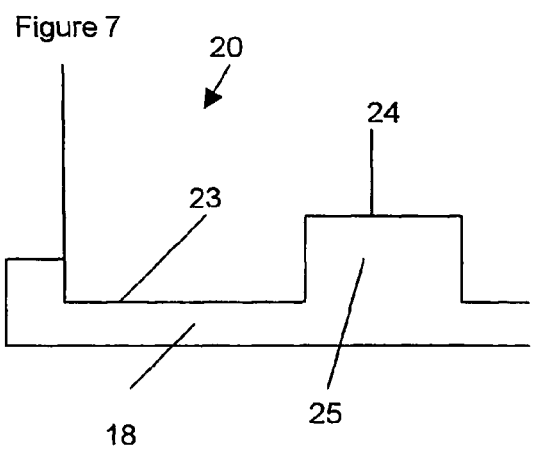
Figure 7

Figure 11
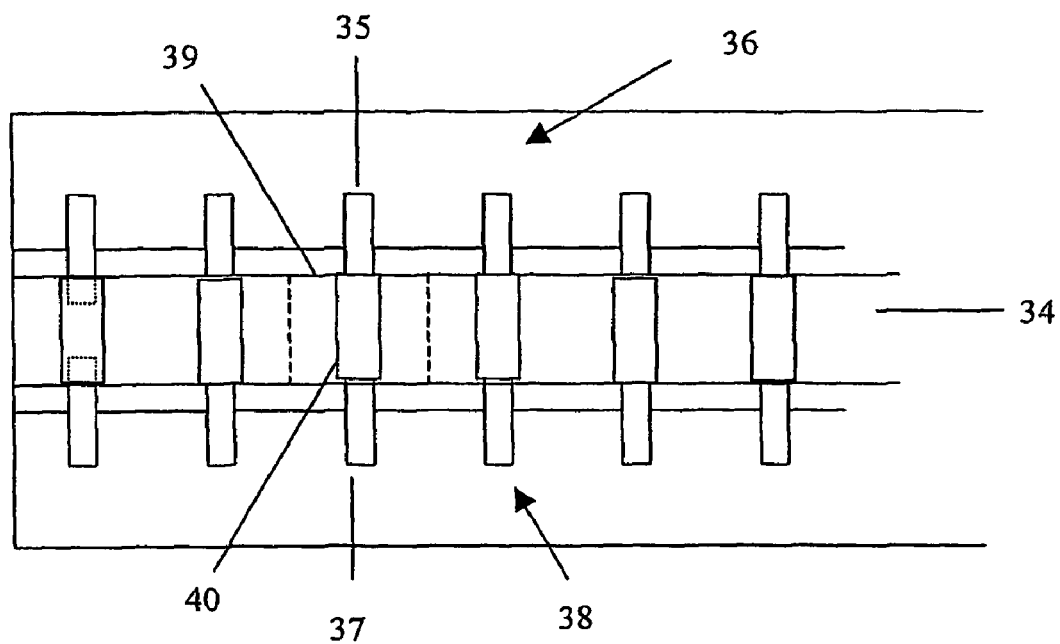
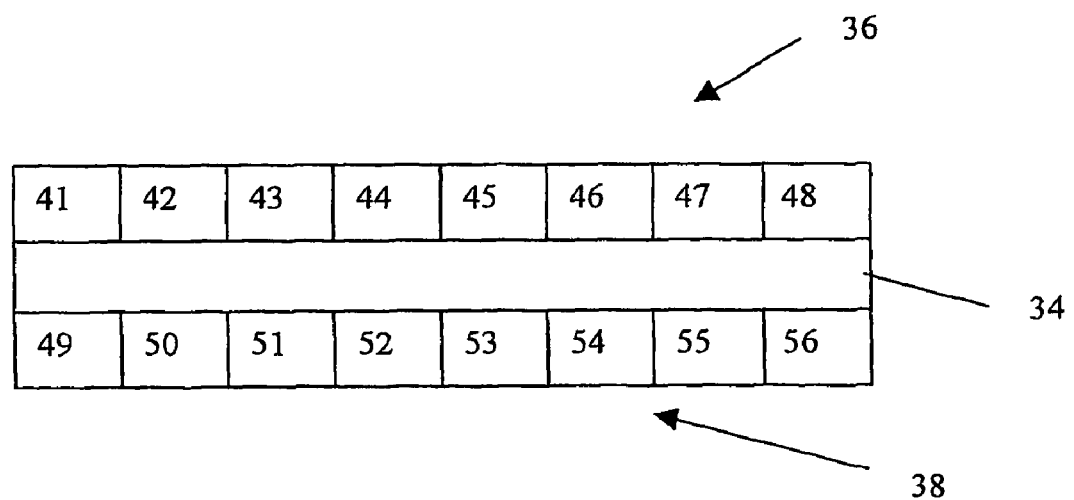
Figure 12

VEHICLE TYRE CHECKING SYSTEM

CROSS-REFERENCE TO RELATED APPLICATIONS

This is a national stage filing which is based on and claims priority to and the benefit of International Application Number PCT/GB2005/002696 which itself is based on and claims priority to and the benefit of UK Patent Application Number 0415258.3. International Application Number PCT/GB2005/002696 was filed on Jul. 7, 2005, and it was published as International Publication Number WO 2006/003467 A1 on Jan. 12, 2006. UK Patent Application Number 0415258.3 was filed on Jul. 7, 2004. The entirety of each of these applications is incorporated herein by reference.

The present invention relates to a system for the determination of the characteristics of tyres on road vehicles, such as the quality of the tyre tread and the tyre pressure. Preferred embodiments of the invention also allow other safety characteristics to be determined, such as vehicle weight.

Whilst the invention is particularly concerned with assessing the tyres of vehicles such as cars, vans and trucks, it is also applicable to tyres of other vehicles such as trailers, towed caravans, motorcycles and aircraft.

Correct tyre characteristics are essential for the safety of a vehicle on a road surface, particularly in wet conditions. As well as an appropriate tyre pressure, there is the requirement for a safe tyre tread footprint, that is the contact pattern the tyre makes with the road surface. A heavily worn tyre may have very little tread. Even a relatively new tyre may have areas where there is no tread, for example if a wheel has locked under braking and the skidding action has caused a flat spot on the tyre, or if suspension or tracking problems result in heavy wear of the tyre on one side, for example producing a feathered edge.

The assessment of tyre tread condition is conventionally performed by manual inspection of the tyre. Tyre tread problems and areas of uneven tyre wear can thereby be diagnosed. However, this is time consuming. Similarly, tyre pressure is conventionally measured by a gauge that is connected to each tyre valve in succession. Again, this is time consuming. Another problem is that checking tyre pressure with a gauge tends to result in a loss of air, and after multiple checks this can be significant. A non-intrusive method would be better.

There are known arrangements for measuring tyre pressure by means of sensors over which a vehicle is driven. For example, in WO-0011442 there is disclosed a system which relies on the principle that the inflation pressure of a tyre equals the pressure exerted on a sensor on which the tyre rests. A vehicle is driven so that a tyre passes over an array of sensors. The force on each sensor is measured and as the contact area of each sensor is known, a number of pressure readings can be obtained. Extreme readings, where a sensor may be at the edge of a tyre and only partially in contact with the tyre, are ignored. The remaining readings can be averaged to provide a value for the tyre pressure. Whilst such a system makes measuring of tyre pressures easier, it does not determine the tread characteristics.

Another system is disclosed in EP-0892259. In this system, a tyre passes over a surface having a lateral array of force sensors which are arranged across the width of the tyre. The output produces an indication of the general mode of contact of the tyre with the surface. If the contact force profile is excessively convex across the width of the tyre, i.e. significantly higher in the centre than at the outside, then this is an indication is the tyre is over-inflated. If the contact force profile is concave, this is an indication that tyre is under inflated. A similar system is described in EP-0545641 and EP-0656269. None of these systems determine tread characteristics.

WO 2004/057292 discloses a system for analyzing the load distribution on a tyre for a vehicle at high speed. This system is not concerned with assessing tyre tread characteristics.

Viewed from one aspect, the present invention provides a method for measuring characteristics of a tyre on a vehicle wheel, comprising the steps of:
(a) moving the vehicle in a longitudinal direction so that the tyre passes over a lateral sensor, the lateral sensor comprising an array of individual force sensing elements which provide outputs related to contact pressure at points on the tyre as it passes over the lateral sensor; wherein
(b) the force sensing elements are arranged laterally at positions across the width of the tyre as it passes over the lateral sensor; and
(c) the outputs from the force sensing elements are sampled at intervals as the tyre passes over, so as to provide data representing the outputs at a number of points distributed over the whole of the tyre footprint that has passed over the lateral sensor; and wherein
(d) the force sensing elements are of sufficiently high resolution to detect positions within the tyre footprint where there is no contact between the tyre and the lateral sensor as a result of there being a tread pattern in the surface of the tyre; and
(e) the data is processed to provide an indication representative of the extent of tread coverage over the footprint of the tyre.

Preferably, the method also includes the step of deriving the tyre pressure from the outputs of the sensing elements.

Thus, in a preferred implementation of this aspect of the invention, as a vehicle is driven over the lateral sensor, individual sensing elements will produce outputs that vary with time as different portions of the circumference of the tyre pass over the lateral sensor. These outputs effectively build up an "image" of the footprint of the tyre than has passed over the lateral sensor. Sensing elements that lie wholly or partially outside of the tyre footprint area at any given time will produce no output or a reduced output. Similarly, sensing elements which at any given time are wholly or partially underneath tread portions cut into the tyre will produce no output or a reduced output. Analyzing the data will provide an indication of what amount of tread pattern there is within the footprint of the tyre that has passed over the lateral sensor.

The extent of tread coverage can, for example, be expressed as the area within the tyre footprint where there is contact, the area where there is no contact, a ratio between the two, a comparison with stored data representing preferred amounts of tread or insufficient amounts of tread and so forth. The precise parameters and manipulations chosen are not relevant to the scope of the invention.

The contact area for the individual force sensing elements needs to be sufficiently small to provide the desired resolution, for example having a contact area of between 2 $mm^2$ and 500 $mm^2$. The size of the sensing element contact area determines the "pixel" resolution of the "image" of the tyre tread. The actual upper limit for the contact area associated with each force sensing element will depend on the type of tyres that will be analyzed with the system. Large tyres for commercial vehicles will have much coarser tread patterns than tyres for small cars. For example for a small car tyre the sensing element contact area might optimally be about 2 to 5 $mm^2$. For larger cars or small vans, contact areas in the range of 10 $mm^2$ to 20 $mm^2$ may be acceptable. For larger trucks contact areas in the range of 30 $mm^2$ to 200 $mm^2$ may be acceptable. In general one would consider the types of vehicle to be checked and then use a resolution that is acceptable but not unnecessarily high as that will increase expense and processing power required. In general, a contact area of about 3 mm² to about 30 mm² will cope with most tyres used on the roads. Typically, a contact area of 3-4 mm² may be used.

The higher resolution sensing elements are used to determine tyre pressure in a manner similar to that when using low resolution sensing elements as in WO-0011442, but at higher accuracy because of the increased number of measurement points.

The use of the higher resolution sensing elements enables a picture of the complete tyre footprint to be built up, thus identifying the actual area of contact over the entire tyre footprint taking into account the tread pattern. By calculating the tyre pressure and the actual area of contact, taking into account the tread pattern, more accurately it is possible to calculate more accurately the force, i.e. the weight being carried by the wheel. Thus, parameters such as axle weight and vehicle weight can be calculated.

The number of individual tyre sensing elements, measured in the lateral direction, may be greater than 100, and for example being 128, 256 or more. In preferred embodiments there is used a pressure sensitive material known as Quantum Tunneling Composite (QTC). Small portions of this can be used for each individual sensing element, for example a 3 or 4 mm square. However, it has been have found that it is possible to use a common strip of QTC material for a number of sensing elements. Electrodes are connected to either side of the strip at suitable intervals along the strip, and individual load transmitting members which engage the tyre bear down on the strip at corresponding intervals. Thus an individual sensing element is defined by a portion of the strip, a pair of electrodes and a corresponding force transmitting member. It has been found that using QTC material in this manner, there are no significant problems with crosstalk between adjacent sensing elements.

A single strip of pressure sensitive material may extend across all sensing elements in the lateral sensor, or there may be a number of separate strip portions.

To deal with the number of connections required to deal with the large number of sensors, they are preferably divided into groups, for example of 16 although a smaller or larger number could be used. On one side, the first electrodes of each group are connected to a first electrode common data line, the second electrodes of each group to a second electrode common data line, and so forth. On the other side, all of the electrodes of the first group are connected to a first group common data line, all of the electrodes of the second group are connected to a second group common data line, and so forth. The data is then sampled by cycling through the combinations, i.e. first group common group data line with, sequentially, first electrode common data line to sixteenth electrode common data line, then second group common group data line with, sequentially, first electrode common data line to sixteenth electrode common data line, and so forth.

Using such a system, the tread quality can be analyzed in the portion of the tyre circumference that has passed over the lateral sensor. However, tyres do not always wear evenly around their circumference, and for example there may be flat spots. In some situations it may be possible to identify such problems by analyzing the tyre on a number of different occasions. For example, if the system is installed at a truck depot, where trucks enter and leave the depot, then each truck will normally drive over the sensor at least twice a day. The portion of the tyre that passes over the sensor will be random and over a suitable period of say a few days, all of the circumference will be analyzed. However such a system cannot be used in e.g. a service station where a car will generally be tested only once in a short period of time.

Preferably, therefore, there is a second lateral sensor spaced from the first in the longitudinal direction, so that there can also be an assessment of tread quality at another portion of the tyre circumference. This could for example be chosen to be diametrically opposite the portion that has passed over the first lateral sensor. By using a number of sensors spaced in the longitudinal direction, the tyre tread can be checked at any required number of positions around the circumference, for example at six or twelve evenly spaced positions. For a tyre of known circumference, the lateral sensors could be arranged so that every point around circumference of the tyre will pass over at least one sensor.

It will be appreciated that using a number of lateral sensors with high resolution sensing elements will add to the cost and complexity of the system. It is therefore preferred to use a simple force sensor as the second and at least one subsequent lateral sensor in the system. Such a simple force sensor could be a single strip, for example of QTC material, giving an output indicative of the total force on the strip, or if desired a lateral array of low resolution sensors.

The data from the first lateral sensor is analyzed to determine tyre pressure and tread quality as described above. The second lateral sensor, of low resolution, is positioned so that substantially the same portion of the tyre circumference passes over it as passes over the first lateral sensor. A simple and convenient way of achieving this will be to position the second lateral sensor immediately adjacent the first lateral sensor. When the tyre passes over the second sensor, an output is given which indicates the force on the second sensor. Force, pressure and area are related by the expression $F=P*A$. Thus, there will be a relationship between the force on the second sensor and the area of contact, and the area of contact will depend on the amount of the tyre surface that is taken up by tread. In a tyre with a tread pattern having portions across the width of the tyre, the area of actual contact with the second sensor will be less than the area of the tyre footprint that is over it. Thus, the force signal output by the second sensor will be different if there is a good tread pattern than if the tyre had an inadequate tread pattern or no tread pattern at all.

The relationship between the area of contact and the output of the second sensor need not be linear. Depending on the nature of the sensor and other factors, the output may not even be directly proportional to the area of contact and in some circumstances the relationship could be inverse. The important thing is that the output for a tyre with an acceptable tread pattern will be different to that for a tyre with inadequate tread.

The first lateral sensor is used to provide an accurate indication of the quality of tyre tread coverage. If the second lateral sensor is used to analyze substantially the same portion of the tyre circumference, then there will be a an output which is in some way related to the tread quality of the tyre at that portion of its circumference. If a subsequent simple force sensor of the same type is used to analyze a different portion of the tyre circumference, then its output should not deviate substantially from that of the second lateral sensor, if the tread quality is substantially the same.

Accordingly, if the first sensor shows good tread coverage, and there is a significant difference between the outputs of the second and subsequent sensors, then there may be one or more areas around the tyre circumference where the tread is more worn than at the portion analyzed by the first sensor. Similarly, if the first sensor shows poor tread coverage, and there is a significant difference between the outputs of the second and subsequent sensors, then this may be an indication that there was a flat spot in the portion of the tyre analyzed by the first sensor.

In accordance with this optional way of operating in accordance with the present aspect of the invention, the actual assessment of tyre tread coverage is carried out by the first, relatively high resolution sensor. However, in accordance with another aspect of the invention an assessment of tyre tread coverage can also be carried out using a first lateral sensor which is of relatively low resolution, if it can be used to provide an indication of both tyre pressure and the width of the tyre footprint contact area.

Viewed from this aspect of the invention, there is provided a method for assessing the tread coverage on a vehicle tyre, comprising the steps of moving the vehicle in a longitudinal direction so that (a) the tyre passes over a first lateral sensor which extends across the footprint of the tyre, the first sensor comprising an array of individual force sensing elements which provide outputs indicative of tyre pressure at points across the footprint of the tyre; and (b) the tyre passes over a second lateral sensor, spaced longitudinally from the first sensor, which extends across the full width of the footprint of the tyre and provides an output indicative of the force imposed on the sensor by the portion of the tyre footprint over the sensor; the method further comprising the steps of processing the output from the first and second lateral sensors, so as to provide an indication of the tyre pressure and an indication of the coverage of the tyre tread.

In one embodiment of this aspect of the invention, the first sensor provides data that can be used to indicate the tyre pressure and the width of the tyre footprint. When the tyre passes over the second sensor, an output is given which indicates the force on the second sensor. From the known width of the tyre footprint and the extent of the second sensor in the longitudinal direction, the area of the tyre footprint which is over the second sensor, can be calculated. As noted above, there will be a relationship between the force on the second sensor and the area of contact, and the area of contact will depend on the amount of the tyre surface that is taken up by tread. The force signal output by the second sensor will be different if there is a good tread pattern than if the tyre had an inadequate tread pattern or no tread pattern at all. By collecting and processing data indicative of acceptable relationships between, for example, the area of the tyre footprint which is over the second sensor and the actual area of contact with the second sensor, a measure of tyre tread condition can be provided.

In practice, the width of the tyre footprint will not be constant along its length, and it will normally have narrower portions adjacent to the leading and trailing edges. To determine the area of the footprint that is actually over the second sensor, various measures may be adopted. For example, it could be assumed that when the maximum width of the tyre footprint is over the second sensor, there will be the greatest force on the second sensor. Thus by looking for the maximum output from the second sensor, and knowing the maximum footprint width from the first sensor, the appropriate calculations could be made. Alternatively, if the speed of the vehicle is known and the distance between the first and second sensors is known, then it would be possible to determine the time at which there is the maximum width of tyre footprint—or indeed another chosen point on the tyre footprint whose width is known—over the second sensor. Similar steps can be taken when using a multiple lateral sensor arrangement in accordance with the first aspect of the invention, to ensure that there are the same conditions for comparing the outputs of the various sensors—i.e. comparing maximum outputs, average outputs and so forth.

In accordance with the present aspect of the invention, it would be possible to sample the output from the second sensor and, knowing the vehicle speed, to build up data representing the force borne by a series of strips of the tyre footprint, which can be used to build up the total force borne by the tyre footprint or a chosen part of it. By knowing the total area of the tyre footprint or the chosen part of it (and this is distinct from the area of contact within the footprint), it is possible to relate the force borne by the footprint to the actual area of contact.

The array of individual force sensing elements of the first sensor can be of relatively low resolution, for example being of the type disclosed in WO-0011442. However, the sensing elements should still be capable of detecting the edges of the tyre footprint so that the width of the tyre footprint can be determined to an acceptable standard of accuracy for the subsequent calculations.

It would be possible to have a second sensor which is large enough in both the longitudinal and lateral directions to accommodate the full footprint of the tyre, although this would not be effective in terms of use of space.

In any event, if the tyre pressure is known and the load borne by a known part or all of the tyre footprint is known, it is possible to provide data indicative of the contact area within the tyre footprint or the known part of it. If the contact area is too high, then there is insufficient tread pattern.

As with the first aspect of the invention, there may be additional lateral sensors to provide readings for different portions around the circumference of the tyre. Using multiple spaced sensors after the first sensor that measures tyre pressure and tread width, it may not be necessary to carry out a full data analysis on each one. The data from one sensor can be analyzed to determine tread quality, and the data from other sensors analyzed to determine whether the outputs are with acceptable bands around the output of the sensor that was subjected to full analysis. If that sensor shows that there is a tyre tread problem, then the tyre needs to be attended to in any event. If that sensor shows that the tread is acceptable but another sensor gives an output whose value is beyond a specified limit form the output of the first mentioned sensor, then it can be assumed that there is a problem. Even if is established that there is more tread elsewhere on the tyre than on the portion originally analyzed and found to have sufficient tread, it may be of concern that there is uneven wear.

In accordance with either aspect of the invention, when a series of longitudinally spaced sensors is provided, the spacing between the sensors will depend on the number of readings required around the tyre and the expected diameter of the tyre. If the system is to be used with vehicles with widely differing tyre diameters, for example trucks and cars or vans, then the spacing will need to be set to give the required coverage for the smallest tyre diameter expected. A typical truck wheel may have a diameter of about 600 mm, but might go up to 1500 mm, and the wheel diameter for a small car might go down as low as 300 mm. However, it would be possible to have variable spacing, for example having relatively closely spaced sensors over one length of the series, sufficient to cover the entire circumference of a car or van tyre, and then more widely spaced sensors to cover the remaining circumference of a truck tyre. There will be more data than necessary for a truck over the first length of the series, and whilst all of the data could be used, it may be sufficient if some, e.g. alternate, readings are disregarded.

If a known tyre is passed repeatedly over the sensors then over a period of time a statistically accurate image of the entire diameter can be built up by referencing previously stored data. The tyre might, for example incorporate an RFID chip or the like for the purposes of recognition. There may be an indication of the vehicle as well, so that it is possible to monitor a tyre/vehicle combination.

There is a common theme between arrangements in accordance with preferred embodiments of both the first a second aspects of the invention, which use multiple, longitudinally spaced sensors to carry out analysis of the tread condition at different points on the circumference of the tyre. Thus, viewed from a further aspect of the invention, there is provided a method for assessing the tread coverage on a vehicle tyre, comprising the steps of moving the vehicle in a longitudinal direction so that the tyre passes over a plurality of lateral sensors arranged to provide data indicative of load and/or pressure, each sensor extending across the footprint of the tyre, the sensors being arranged longitudinally spaced in a series, so that a different portion of the circumference of the tyre passes over respective sensors, and wherein the data from the sensors is processed to provide an indication of the tread coverage in the portions of the tyre that have passed over the sensors.

In a preferred arrangement in accordance with the various aspects of the invention, one or more lateral sensors are used to check the tread depth. In this arrangement a lateral sensor which extends across the footprint of the tyre has a tyre contacting layer which is resilient, so as to enable portions to extend into the tread portions of a tyre on the sensor. The arrangement is such that portions of the resilient layer will extend into a tread portion by no more than a predetermined distance, for example equal to just below a specified tread depth. Thus, in those areas where the tread depth is less than that limit the resilient material will contact the base of the tread. This will increase the area of contact of the tyre with the sensor and thus change the output. This arrangement is not only an option in combination with the various aspects of the invention discussed earlier, and is innovative in its own right.

Thus, viewed from another aspect the invention provides a method for assessing the tread depth of a tyre on a vehicle, comprising the steps of moving the vehicle in a longitudinal direction so that the tyre passes over a laterally extending force sensor which extends across the footprint of the tyre, the output of the force sensor varying in accordance with the area of contact of the tyre with the sensor, wherein the force sensor is provided with resilient portions in contact with the tyre, the resilient portions extending into tread portions on the tyre, so as to contact the base of tread portions whose depth is below a specified limit and thus increase the area of contact between the tyre and the force sensor.

Thus, considering the first aspect of the invention, with a resilient layer engaging the tyre, sensing elements in the high resolution sensor that would have detected an area of tread, by giving no output or a low output, will give an increased output if the tread is of insufficient depth. In other aspects of the invention where a simple, low resolution sensor is used in the assessment of tread coverage, the increase in contact area will produce a different output, which will likewise indicate a reduced amount of tread coverage.

The resilient layer could be provided by the sensing material of the sensor, but is preferably a resilient layer superimposed on the sensor.

Where a simple sensor is required to measure force in aspects of the invention, it may be in the form of a laterally extending strip or other member supported on one or more load sensing elements, for example portions or a continuous strip of a Quantum Tunneling Composite (QTC), so that the entire load on the member can be measured. The sensor could be divided into segments e.g. for ease of manufacture or installation.

The following discussion concerns the arrangement of one possible embodiment of the invention, in which there is a first, high resolution, sensor, and then a series of second sensors. However, portions of this discussion will be relevant to other aspects of the invention as described above.

In this arrangement, the output from the first sensor is sampled at a predetermined frequency as the tyre moves over the first sensor, for example at 100 Hz, 200 Hz, 400 Hz or greater. The frequency used will depend on a number of factors, including the vehicle speed, to ensure that an appropriate number of measurements can be made over the tyre footprint as it moves over the first sensor. To provide an accurate representation of the tyre footprint, the linear distance travelled between each sampling needs to be known, and this means having a measure of vehicle speed. This may be achieved in many ways, for example using technology of the sort found in speed cameras. However, in one preferred embodiment of the invention, there is provided a preliminary detecting sensor, in advance of the other sensors. This can, for example, be a simple strip sensor over which the tyre passes. The time between there being an output from the detecting sensor and one of the other sensors, for example the first sensor, is used to calculate vehicle speed having regard to the known distance between the detecting sensor and the other sensor. In general, however, the outputs from any two sensors at a known spacing can be used to determine speed. Indeed, whilst the vehicle is driving over the series of sensors, the speed could be continually updated.

The order in which the sensors are arranged can be varied and it is not necessary for the vehicle to pass over the first sensor before passing over the second sensor or, as in the preferred arrangement, a series of longitudinally spaced second sensors. Data can be collected from all of the sensors before being analyzed. In the preferred embodiment the vehicle travels over a detecting sensor, the first sensor, and the series of second sensors, in that order. However, the vehicle could pass in sequence over the detecting sensor, the series of second sensors, and then the first sensor. There could be no separate detecting sensor, and simply one or more second sensors and the first sensor, possibly followed by more second sensors.

In some systems, the arrangement could be symmetrical so that a vehicle can drive over the sensors in any direction. In such an arrangement the system may include a sensor either side of the first sensor, either of which can act as a detecting sensor or a second sensor, depending on the direction of travel.

Whilst a detect sensor may be a single lateral element, it may be divided into lateral segments, for example ten, or more or less. By noting which segments produce readings, it will then be possible to identify the lateral extremities where there is no tyre present. This information can be used to identify the sensing elements of the measuring sensor for which it is unnecessary to acquire or process data, thus reducing processing overheads.

Preferably, two series of sensors—i.e. in one preferred embodiment the detecting sensor, the first sensor and the series of second sensors—are provided, one for each side of a vehicle, thus allowing tyres on both sides of the vehicle to be examined simultaneously.

The load sensing elements of the first sensor may be selected to accommodate the largest load and finest tread pattern as defined by the type of vehicle and tyre to be analyzed. As noted above, a fine or detailed tread pattern may require a large number of small elements and a coarse or large tread pattern may requiring a smaller number of larger elements. For example, commercial vehicles such as lorries may require high capacity load sensing elements to accommodate the vehicle weight but a relatively low number of elements may be required to detect the tyre pattern. For cars, lower capacity load sensing elements may be required but a relatively high number of elements may be required because of the higher resolution of the tyre tread pattern.

A typical lorry tyre is about 400 mm wide, and on a double axle with two wheels used together, the width across the two tyres may be about 650 mm to 700 mm or higher such as 850 mm. Some single tyres may have a width of 650 mm or more. To account for drivers not being properly centred, in general a sensor may extend for perhaps 900 mm to 1000 mm, or even up to 1500 mm. As noted above, there may be one sensor for each side of the vehicle, but alternatively the sensor could extend the full width of the vehicle or indeed the width of the carriageway. The arrangement may distinguish between different axles on a vehicle, and different wheels on the axle, and be able to count the number of axles and wheels.

In order to account for a distribution of tyre pressure values the system is preferably arranged to determine the contact pressure by disregarding indications from elements below a certain minimum pressure threshold. In effect the system could select only the highest pressure indications and calculate an average to determine the contact pressure.

Whilst the sensing elements of the first sensor may be arranged in a two dimensional array, as disclosed for example in WO-0011442, the use of high resolution sensors means that in the preferred embodiment of the invention a single line of sensing elements can be used. Nevertheless, there may be high resolution systems using multiple lines of sensing elements, staggered sensing elements and so forth.

In a further development, vehicle tyres are provided with machine readable identifiers, such as RFID tags. A database can be kept for each tyre so that its quality can be monitored and corrective action taken before a serious problem arises. Additionally or alternatively, the ID of the tyre can be linked to known ideal tyre parameters so that assessment of tyre tread quality can be optimized.

Other aspects of the inventions disclosed concern apparatus for measuring tyre characteristics.

Thus, viewed from one further aspect of the invention, there is provided apparatus for measuring characteristics of a tyre on a vehicle wheel, comprising a lateral sensor over which a tyre is to pass in a longitudinal direction, the lateral sensor comprising an array of individual force sensing elements which provide outputs related to contact pressure at points on the tyre as it passes over the lateral sensor; wherein the force sensing elements are arranged laterally so as to be at positions across the entire footprint of the tyre as it passes over the lateral sensor; means are provided for sampling the outputs from the force sensing elements at intervals as the tyre passes over, so as to provide data representing the outputs at a number of points distributed over the whole of the tyre footprint that has passed over the lateral sensor; wherein the force sensing elements are of sufficiently high resolution to detect positions within a tyre footprint where there is no contact between the tyre and the lateral sensor as a result of there being a tread pattern in the surface of the tyre; and means are provided for processing the data to provide an indication representative of the proportion of the footprint area of the tyre over which there is a tread pattern.

Viewed from another further aspect of the invention, there is provided apparatus for measuring the tyre pressure of a vehicle tyre and for assessing the tread coverage on the tyre, whilst the vehicle is being moved in a longitudinal direction over sensors, the apparatus comprising a first laterally extending sensor comprising an array of individual force sensing elements which provide outputs indicative of tyre pressure at points across the footprint of the tyre; a second laterally extending sensor, spaced longitudinally from the first sensor, which provides a signal indicative of the force on the sensor; means for processing the signals from the sensing elements of the first sensor, so as to provide the tyre pressure of the tyre; and means for processing the signal from the second sensor, and the signals from the sensing elements of the first sensor, so as to provide a measure of the quality of the tyre tread.

Viewed from a still further aspect of the invention, there is provided a linearly extending sensor for use in the assessment of the tyre tread quality of a vehicle tyre whilst the tyre is moved over the sensor, with the sensor extending laterally across the tyre, the sensor providing an electrical output which depends on the area of contact between the vehicle tyre and the sensor, wherein the sensor is provided with resilient portions adapted to extend into tread portions of the tyre and to engage the base of tread portions whose depth is less than a predetermined minimum, so as to increase the area of contact between the vehicle tyre and the sensor if there are tread portions whose depth is less than the predetermined minimum.

Another aspect concerns the construction of a high resolution sensor, and viewed from this aspect there is provided a linearly extending sensor for use in the assessment of the tyre tread quality and/or tyre pressure of a vehicle tyre whilst the tyre is moved over the sensor, with the sensor extending laterally across the tyre, wherein the sensor comprises a number of individual sensing elements, arranged along the linear extent of the sensor, each individual sensing element including a portion of pressure sensitive material whose electrical properties vary in accordance with pressure, a pair of electrodes electrically connected to the portion of pressure sensitive material, and a movable force transmitting member arranged to transmit force to the portion of pressure sensitive material from a vehicle tyre passing over the sensor, wherein a continuous strip of pressure sensitive material defines the portions of pressure sensitive material for a number of individual sensing elements.

Preferred embodiments of the inventions will now be described, by way of example only, and with reference to the accompanying drawings in which FIG. 1 is an overview of the system;

FIG. 2 is a view of a strip of sensing elements;

FIG. 3 is a section of a strip sensor;

FIG. 4 is a graph showing the responses of a detecting sensor and a measuring sensor;

FIG. 5 is a section of a strip sensor for assessing tread depth;

FIG. 6 shows the sensor of FIG. 5 with a tyre having acceptable tread;

FIG. 7 shows the sensor of FIG. 5 with a tyre having unacceptable tread;

FIG. 11 is a plan view of an alternative embodiment of high resolution sensor;

FIG. 12 is a schematic diagram of the electrode arrangement in the embodiment of FIG. 11;

Figure 8:
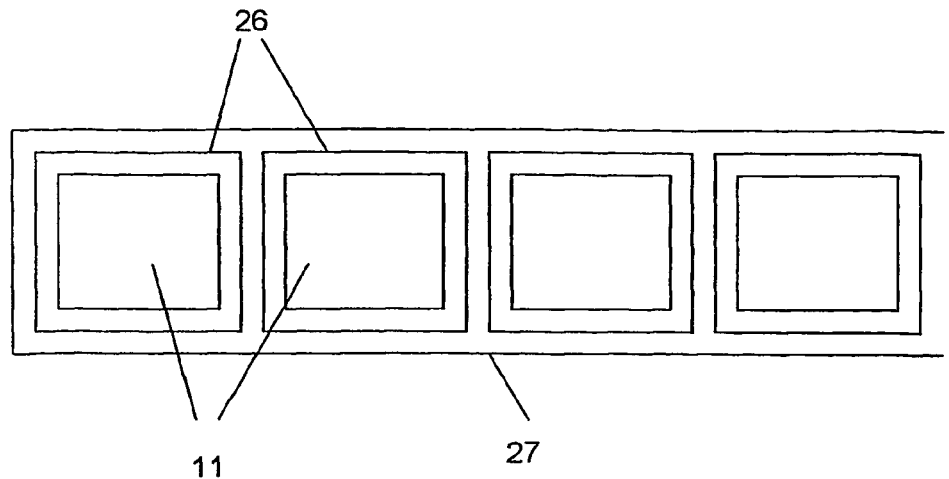
FIG. 8 is a detail view of a linear array of sensing elements.

One embodiment of the system is designed to acquire various parameters relating to the vehicle and it's integrity via processing data obtained from the tyre pressure footprint on the travelling surface whilst the vehicle is moving. The system consists of a number of sensor types laid either on or in the ground with the appropriate electronics for data acquisition and processing, all protected against the environmental conditions and the forces imparted by the tyres. The system can use hardwired and wireless technology as appropriate and can incorporate EMC measures for immunity and emissions reduction. The system is designed with simplicity in mind and will acquire detailed information either directly or derived from first principles.

The system can provide values for the following parameters:

| | |
|---|---|
| Tyre Pressure ($P_{Tyre}$) | Direct |
| Tyre Temperature ($T_{Tyre}$) | Direct |
| Vehicle Speed ($v_V$) | Direct |
| Tyre footprint area ($A_f$) | Direct |
| Tyre footprint aspect ratio ($R_{Aspect}$) | Direct |
| Tyre footprint orientation ($\theta$) | Direct |
| Weight on a single tyre ($W_T$) | Direct |
| Axle Weight ($W_A$) | Derived |
| Vehicle Weight ($W_V$) | Derived |
| Vehicle Weight Distribution | Derived |
| Tread Depth ($x_T$) | Derived |
| Tyre wear | Derived |
| Suspension Integrity | Derived |

Tyre temperature ($T_{Tyre}$) could be measured using, for example, thermal imaging or high speed thermistors.

As shown in FIG. 1, the system comprises two sets of sensors 1 and 2 laid side by side in two series in the direction of travel of a vehicle 3 such that they align with the vehicle's wheels with tyres 4 when it passes over them. The width of the sensor sets will be such that some latitude for error in alignment of the vehicle is allowed as it passes over them, and in the present embodiment each sensor is about 900 mm wide. The specifics of the sensor elements will be determined by the target vehicles group, for example a different resolution is required for trucks as opposed to cars, as discussed earlier. Each sensor extends laterally, i.e. perpendicular to the direction of travel. There is an initial detecting sensor 5 for use in measuring the speed of the vehicle, a high resolution measuring sensor 6 for measuring tyre pressure and tread coverage, and a series of identical low resolution tread 7 for assessing tyre tread coverage over the entire circumference of a tyre as it passes over the sensors 7. A comparison sensor 7', identical to sensors 7, is positioned immediately adjacent the measuring sensor 6 All of the sensors 5, 6, 7 and 7' are parallel but not necessarily perpendicular to the direction of travel.

Close to the sensor sets is a box 8 housing electronics. The electronics will comprise a suitable power source/supply, with sensor conditioning and output components coupled to a multiplexer the output of which will be input to a microcontroller. The microprocessor will process the acquired data via some suitable output components and will transmit the acquired results to a data processing unit 9. However, in an alternative arrangement, raw data, or at least some of the raw data, could be transmitted to the data processing unit 9 for processing there This could be via a wireless local data relay, in one preferred embodiment, or a wired link. From here, data can be supplied in a suitable form to a required target. Suitable output targets are as follows and are not exclusive;

a) Local Display and/or Printing Device located either in an office, forecourt shop, service station forecourt, commercial vehicle area, or port of entry for example.

b) Till receipt, car park ticket c) Suitable Relay box to transmit information to the Internet for inclusion either in a suitable Database and/or for transmission to a local customer specific application.

In an alternative arrangement, a remote data processing system is an initial target, which receives raw data and processes that data to obtain the direct and derived values desired. This information is then forwarded to targets such as those identified above.

An additional (e.g. magnetic) sensor 10 is provided that will trigger if a vehicle is within range of the sensor system. Thus, the system can be kept on standby at low power consumption, with only the additional sensor active, until a vehicle approaches. In one embodiment, the detecting sensor 5 is also polled in standby mode, with the figures going into a rolling buffer, so that when the system is activated there is data in respect of a tyre initially encountering the detecting sensor.

If it is required to identify the target vehicle electronically either a number plate recognition system can be used or a wireless identification tag can be located on the vehicle. However, other scanning/vehicle identification methodologies are possible. In this particular embodiment, the electronics close to the sensor sets will process the sensor data and then transmit that data along with a timestamp to another location for further processing to suit the end customer requirements. However, raw data, or at least some of the raw data, could be transmitted to remote data processing apparatus for processing there. The options are numerous but the essence is the same, and the vehicle identification will be linked to the sensor data and both will be logged. The electronics close to the sensor sets will process the raw data to produce data to indicate real values as described in the list of parameters above. Once the pressure data has been obtained it can then be analyzed either for trends or for direct indications of tyre condition or derived indications of vehicle health as can be seen from the imprint of the tyre on the ground.

The detecting sensor 5 is a single strip sensor element used to detect the presence of a tyre and for calculation of vehicle speed.

The measuring sensor 6 system uses a single line of high resolution sensing elements 11 as shown in FIG. 2, and time-slicing, with the advantage of a significant reduction in the number of sensors required to build an image of the tyre footprint. The construction of the measuring sensor is described in more detail with reference to FIGS. 8 to 10. Time-slicing or repeated polling of the sensing elements within the strip coupled with knowing the vehicle speed, enables a 2-D tyre footprint to be obtained. It may also be possible to have a "3D" footprint, for example showing how the tyre profile curves away and upwardly at the edge of the footprint. Once the data has been acquired for a vehicle's full set of tyres it can be analyzed in accordance with the information or output required.

Tyre pressure is the least complicated measure and only a small subset of the sensor output data is required. In the preferred arrangement, the system will actively disregard irrelevant data and take a statistical measure of the top few percent of pressure readings, disregarding outliers. The system could operate with a single strip sensor for pressure measurement simply logging peak data. However, for more complex measures such as vehicle weight and tread coverage, the entire footprint needs to be calculated using high resolution sensing elements and an indication of the tread pattern obtained.

The system described is capable of acquiring all the attributes discernible from a tyre's footprint. Alternatively, a reduced functionality system could be employed, as the system design is modular. To achieve full functionality, and in particular to assess tyre tread condition, the series of tyre tread condition strip sensors 7 is required.

Each of the vehicle tyres rolls across each of the strip sensors in turn.

The tyre tread condition strip sensors 7 are for indication of tread depth and peripheral integrity of the tread pattern, being laid in a linear manner to capture data from the complete circumference of the smallest tyre of the target set of vehicles with the angular definition required. The number of strips will be increased to cover the circumference of the largest anticipated tyre diameter. Each sensor 7 is a single element, for example a strip of pressure sensitive material, designed to be sufficiently compliant and robust enough for the application and frequency of use. The data from the measurement sensor will be used to check the integrity of the sensors 7 in that additional calculations will be made. If tyre width and vehicle weight are known, an indication of the correct output for a healthy tyre can be calculated.

The sensor 10 is placed near the electronics to detect an approaching vehicle. This will pre-enable the electronics for post-trigger information and detect if a vehicle stalls or stops. This is not essential for system operation but will help reduce power overheads, as it will enable the unit to "sleep" between measures. Alternatively, if a fault is detected with the magnetic sensor the system can stay "awake" and use a rolling buffer to store limited pre-trigger information and increase the accuracy of the system. Finally, with the incorporation of power management or for the system in its simplest form the system will log data when the detecting strip output rises above a pre-determined threshold. When enabled the acquisition system for the most complex and complete system will acquire time-sliced data from all strip sensors, processing data as necessary for the required outputs.

If the sensor 10 is used to detect the arrival of a vehicle, it is possible for the system to start acquiring data from the measuring sensor 6 before the detecting sensor 5 is activated, the data then being used in combination with the data from the various sensors subsequently. This may be of use if the detecting sensor 5 is arranged behind the measuring sensor 6 rather than in front of it. In any event, in some embodiments the system may need to take into account that there are detecting strips 5 both before and after the measuring strip.

Each strip sensor 5, 6, 7 uses a pressure sensitive material known as Quantum Tunneling Composite (QTC). Each sensor type can employ the same material, however for system efficiency a slightly differing material can be used for each sensor type. However, the invention does not rely on the exclusive use of QTCs as other pressure sensitive materials or components could be employed, such as carbon filled polymers, capacitive sensors and so forth. QTCs are preferred as they have been considerably developed and are relatively simple to utilize. The sensitivity of the system will depend on a number of factors such as sensor size and electrode configuration. The electronics and subsequent algorithms will determine the response and outputs of the system in response to a vehicle wheel or set of vehicle wheels rolling over the sensor sets. The sensor size and electrode configuration can take a number of forms.

A schematic section of the detect sensor 5 is shown in FIG. 3. It consists of length of QTC material 12 either in strip or sheet form, with electrodes 13 and 14 placed on either or both sides of the material, or across the lower face with a conductive material across the upper face to assist with the sensitivity of the strip and the distribution of the applied load due to a vehicle wheel rolling over the strip. The output is monitored and used to trigger the main data storage and analysis functions within the electronics and will also aid the subsequent analysis as the output will vary according to the variables discussed above. The detect sensor may be positioned in a suitable housing and have a protective upper layer. A rolling buffer is preferably used so that once measurements commence, immediately preceding data from the detect sensor can be used as necessary.

As shown in FIG. 2, the high resolution measuring sensor 6 comprises a number, typically more than 100, and for example 128, 256 or more, square sensing elements 11 aligned in a single row with a size and spacing according to the target set of vehicles and the definition of the tyre footprint required. In this particular embodiment, 4 mm square sensors are arranged uniformly in a line with a 5 mm pitch. If the vehicle set is to be predominantly cars and the tread pattern is to be determined then the sensor size may be smaller than if the target vehicle set is commercial trucks and a limited tread definition is required. The sensor specification will be targeted at the minimum system requirements, for example if the target vehicle set consists of cars and commercial trucks the size of the sensor will be dictated by the cars whereas the load protection will be dictated by the trucks. The principle of a single row of sensors will however remain. The sensitivity will be determined by the electrode arrangement, the QTC material used and the outer packaging required for protection. As the vehicle wheels roll over the sensor strip the spacing of the sensors will be such that either a macroscopic parameter such as tyre pressure, $P_{Tyre}$, can be derived simply and without the need for other strip sensors, or for a more complex system the tyre tread pattern, weight borne per tyre, vehicle weight etc. can be determined. The output of each sensor will be read either in a single or sequential acquisition at a frequency, $f_{DAcq}$, pre-determined by the application.

The sensor elements of the measuring strip sensor will vary in characteristics with respect to ambient temperature, and temperature sensors may be provided for ambient temperature and tyre temperature. In the quiescent state the output will vary according to ambient temperature, this effect will be characterized and used to adjust and calibrate the sensor element outputs accordingly.

The highest value of all the values above a minimum threshold will be determined and the mean of the top few percent taken by logging, for example, the 50 maximum readings (for example from 160 readings@1 kHz in less than a second ) in a vector. The process inherently eliminates the readings outside and around the edges of the footprint as well as the rest of the footprint once the peak readings have been obtained; as the footprint rolls past the strip sensor the pressure on the sensors will fall as will their output.

Once the vector has been acquired the statistical mean and standard deviation, $\sigma$, will be taken to identify if there are outliers. If $\sigma$ is above a threshold value then the data is to be examined for large differentials across the data set. The outliers can then be eliminated from the calculation of pressure and the mean and $\sigma$ recalculated. Once $\sigma$ is within acceptable bounds then the mean will give an indication of Tyre Pressure, $P_{Tyre}$. Alternative methods eliminate outliers, and/or look for pressure peaks as the data is acquired, and/or look for general distributions.

Data will be collected and analyzed as the scan of each tyre progresses. If the more complex functions are required, all the data values will be collected and post-processed to determine those parameters once the full set of data for each of the tyres has been obtained. However, the pressure calculation as described above will generally be processed as the data is collected. The pressure calculation is simple as sensor position or time acquired is not relevant. Once calculated for each tyre of the vehicle this data will be transmitted to the target output device.

For more complex measurements than the simple measure of tyre pressure (simple non-acquisition of all data below a minimum pressure threshold and a rolling peak that disregards all values less than the top few percent of values) vehicle speed needs to be determined so that sensor acquisition frequency can be related to linear distance travelled. It can be seen that if the linear distance between the detecting and measuring sensors is known and the time differences between pressurizing each is known, then the vehicle speed, $v_V$, can determined for rolling onto and off the measurement strip sensor. With the distance between the detecting sensor 5 and the measuring sensor 6 being x, and the time difference being Δt, the speed will be:

$$v_V = x/\Delta t$$

Knowing the vehicle speed and the acquisition frequency an image of the tyre footprint can be obtained. If the sensor resolution is sufficient, as in the preferred embodiment, then the tread pattern coverage can also be determined and the more complex measures, such as vehicle weight, can be calculated. For each sampling of all the sensing elements 11, the vehicle tyre will have moved by a distance:

$$\Delta x = v_V / f_{DAcq}$$

Thus, once the magnetic sensor 10 has been triggered then the detecting sensor 5 will be monitored and the output placed into a buffer (stack), for example for pre-trigger information. The buffer size may be, for example, 1000 elements, and this will allow for 1s of pre-trigger information data at a sampling frequency, fDAcq, of 1 kHz, for example.

Once the detecting strip is triggered then the detecting buffer will be added to at each scan (at 1 kHz) until the measuring sensor 6 output falls back to zero or a threshold value that indicates that the tyre has rolled past.

As the detecting sensor output is stored into a buffer, so is the output from the measuring strip sensor. When the triggered event has completed, two vectors will result, one for the detecting sensor, the other for the measuring sensor. Each will be examined to determine the time of the rising and falling edges of the sensor outputs, as shown in FIG. 4, which illustrates the output of the detecting strip sensor and a single element of measuring strip sensor with respect to time. The time of each edge will be a simple function of the position of each data point in the vector. In general there will always be one detecting sensor providing data whilst data is being acquired from the measuring sensor, and in some cases one detecting sensor either side of the measuring sensor.

Once the trigger times have been determined the calculation of vehicle speed at the start of the event is the ratio of the elapsed time of each rising edge, $\Delta t_1$, and the distance x between the sensors. The vehicle speed at the end of the event can also be calculated in a similar manner for the falling edges, using $\Delta t_2$. The pre-trigger information allows for an accurate determination of the trigger time. Without the pre-trigger information then the speed can still be calculated but the accuracy is reduced.

The calculated speed of the vehicle rolling onto the sensors will be compared with that calculated for the vehicle rolling off the sensors. If there is a significant difference then the two values are used to calculate the footprint length with an appropriate function selected to interpolate the differences over time.

The axle weight, $W_A$, is derived from the scanned measuring strip sensor output. For accuracy it will be calculated once the entire footprint of each tyre on an axle has passed over the sensor as the vehicle speed is required for the calculations.

The output of the measurement strip sensor will be a sequence of pressure vectors separated in time by the scanning period, $(f_{DAcq})^{-1}$ and in longitudinal distance on the ground, $x_{long}$, by the ratio $v_V/f_{DAcq}$.

Accurate prediction of axle weight requires that the total footprint contact area is known and not simply the overall area of the footprint. The measurement strip sensor elements directly beneath the voids in the tread pattern will not be loaded. However due to edge effects some partial loading may be seen and thus readings below a pre-determined threshold will be set to zero and the pressure vectors modified accordingly.

Each vector element can be related to an area on the ground as the sensor width $x_{trans}$ will be known and the distance $x_{long}$ can also be determined. If $v_V$ varies significantly during the acquisition then $x_{long}$ will be adjusted for each pressure vector accordingly.

Due to the fact that the measuring strip sensor is scanned and the footprint has travelled forward a distance $x_{long}$ between each scan, an interpolation function is used to model the change in pressure or footprint length for each element between the scans. This model will then be used to calculate the average pressure taking account (if necessary) of variations in $x_{long}$ due to significant changes in $v_V$.

The product of the sum of all pressures and the sum of the areas of the loaded elements will give the force on the ground, $F_{Gnd}$. The weight on the ground at each tyre can then be simply obtained by dividing $F_{Gnd}$ by gravitational acceleration, g.

The total axle weight will be determined from the weight data obtained from the tyre footprint of all the wheels on an axle. Each weight as detected by each tyre footprint will be stored separately for display and further analysis if required. The weight distribution of a vehicle may be shown in a number of ways, for example as a percentage of total weight per wheel, per axle and so forth.

The footprint total area, $A_f$, for each tyre will also be calculated from identifying the footprint edges within the measurement strip sensor vectors. As the footprint rolls over the strip sensor the width will vary as will the number of unloaded sensors across that width. Therefore the loaded width for each vector will be calculated and coupled to the vehicle speed to determine total footprint length. Once the loaded width and length between each vector is known the area, $A_f$, of each tyre footprint is calculated and saved along with the footprint aspect ratio, $R_{Aspect}$ and the aspect ratio orientation, θ, for further analysis.

The vehicle weight, $W_V$, is simply a summation of all axle weights, $W_A$, for a vehicle. A vehicle's weight distribution can be shown simply as a percentage of $W_V$ per wheel or per axle.

Having calculated vehicle weight and its distribution and the tyre footprint area, aspect ratio and orientation, a model will be derived that indicates suspension health.

By sampling the data from the sensing elements 11 as the tyre moves over the sensor 6, it is possible to build up data representing a "picture" of the tyre footprint that has passed over the sensor, enabling an indication of the area of contact within that footprint to be determined. The greater the area of contact, the less of the tyre footprint is provided with a tread pattern.

As shown in FIG. 5, each tread condition sensor 7 (and comparison sensor 7') is a single strip sensor similar to the detect sensor, with the sensing material 15 and two electrodes 16 and 17. However the upper layer will be considerably more compliant such that it can be deformed into the tread pattern to at least the legal minimum depth, and in this embodiment this is provided by an additional resilient layer 18 of a suitable polymeric material. The electrodes will run the length of the sensor and the output will be a function of the degree of depression plus the proportion of the strip that is depressed.

The comparison sensor 7' provides an output in respect of substantially the same portion of the tyre footprint that has passed over the high resolution sensor 6. This output will depend on the extent of tread coverage which is above the prescribed minimum depth. The outputs from the other sensors 7 will indicate whether there is a different state of the tread at other regions around the tyre circumference.

Thus, a measure of tyre wear can be calculated for an entire tyre. If each tyre and/or vehicle is fitted with some form of RFID (Radio Frequency Identification) tag then wear, and pressure information can be logged and transmitted to the user via the appropriate mechanism, e.g. included in a usage database, or indicated directly to the user with other information.

FIG. 6 and FIG. 7 show two differing loading scenarios for a healthy tyre 19 and a worn tyre 20. The tyre 19 has a deep tread with deep recesses 21 into which portions 22 of the resilient layer extend, However, the area of contact is not affected by the intrusion of the portions 22 into the tread recesses. By contrast, the worn tyre 20 has a worn peripheral area 23 that is bare of tread, and adjacent to that only shallow treads 24 into which portions 25 of the resilient layer extend. Thus there is an increase in contact area because the peripheral tread is missing and because the portions 25 of the resilient layer 18 extend fully into the shallow tread portions 24 and contact the base of the tread portions.

The tyre condition strip sensors 7 each take a measurement from a pre-determined angular spacing around the periphery of the tyre and thus significant flat spots or partial wear can be determined. The output of each sensor 7 will rise as the tyre footprint rolls onto it and fall as it leaves and therefore a number of degrees, dependent upon tyre pressure and vehicle weight, of rotation of the tyre will be seen by each sensor.

The number of sensors 7 and their spacing will be dictated by the anticipated vehicle set and the appropriate legislative requirements. For example if the target vehicle set minimum tyre diameter is 606 mm and an indication of health is required every 30 degrees of rotation then 12 sensors are required spaced nominally 158 mm apart. To ensure system integrity a nominal gap less than that given by simple calculation will be used, taking into account installation tolerances and a sufficient number of strip sensors to cover the linear distance required to give an indication of health for at least 360 degrees of rotation. Optional elements can be added to cover more than the 360 degrees of rotation. The installation will be designed to give an indication of tyre peripheral health for the smallest expected external diameter, including wear, at the expected circumferential spacing plus additional elements to accommodate the largest diameter tyres and hence larger linear distance expected. The use of non-linear spacing may capture a range of tyres.

Prior to rolling over the tyre condition sensors 7, data will already exist from the detecting sensor 5 and measuring sensor 6 that will indicate vehicle weight, axle weight and the footprint force for each tyre. Also, examination of the measuring sensor pressure vectors will show a tread pattern (or not) of an angular section of the tyre that relates to its footprint at a particular pressure and vehicle weight. This particular data will be linked to legislative requirements to check if the tyre is legal with regard to the tread pattern across the tyre and that it is not feathered. This data can also be used via a suitable model to predict the tyre condition sensor output for a depth of tread greater than the legal minimum requirement, $x_T$.

As the tyre rolls over the sequence of sensors, and as the output for a tyre with sufficient tread depth, $x_T$, can be provided, a number of conclusions can be drawn.

If the output is nominally the same for all of the tyre condition sensors 7' and 7, and appropriate for a tyre with a tread depth of at least $x_T$, then the tyre can be assumed healthy If the output is nominally the same for all of the tyre condition sensors and inappropriate for a tyre with a tread depth of at least $x_T$, then the tyre will either be worn or require inspection as it will be close to the limit.

If the output varies for all of the tyre condition sensors 7 and 7' and is inappropriate for a tyre with a tread depth of at least $x_T$ at any one or more sensors, then the tyre can be assumed to be wearing unevenly and is either worn or requires inspection as it will be close to the limit.

If the output varies for all of the tyre condition sensors and is appropriate for a tyre with a tread depth of at least $x_T$ at all sensors, then the tyre can be assumed to be wearing unevenly and inspection will be recommended.

Using QTC material for the sensors allows for a number of possibilities in design and this preferred aspect of the invention covers the possibilities of using all available material forms. The strip sensors of the single elements, i.e. detecting sensor 5 and tyre condition sensors 7 and 7', will simply require electrodes either on one face of the material, across the material or a combination of both. The sensor elements will be encapsulated such that the pressure from a tyre rolling over the strip can be detected and that the leading and trailing edges of the footprint do not affect the readings. One preferred solution is to use a sloped edge, i.e. an initial upwardly sloping ramp in the direction of travel. This may be followed by a flat portion, or land, before the array of sensing elements. After the sensing elements, there may for example be a relatively sharp ramp back down. Of course, particularly in bi-directional arrangements for example, the ramps may be symmetrical.

The measuring strip sensor 6 requires a different encapsulation in that it must be designed to reduce/eliminate cross-talk between the sensor elements. If a single element 11 is compressed then the adjacent elements should not also show a reading or if they do it is understood, relatively small and inconsequential with regard to the macroscopic behaviour of the device.

The sensor elements in all cases are protected from mechanical overload either by the stiffness of the elements or a structural channel or mesh depending upon the number of elements within the strip sensor.

Figure 9:
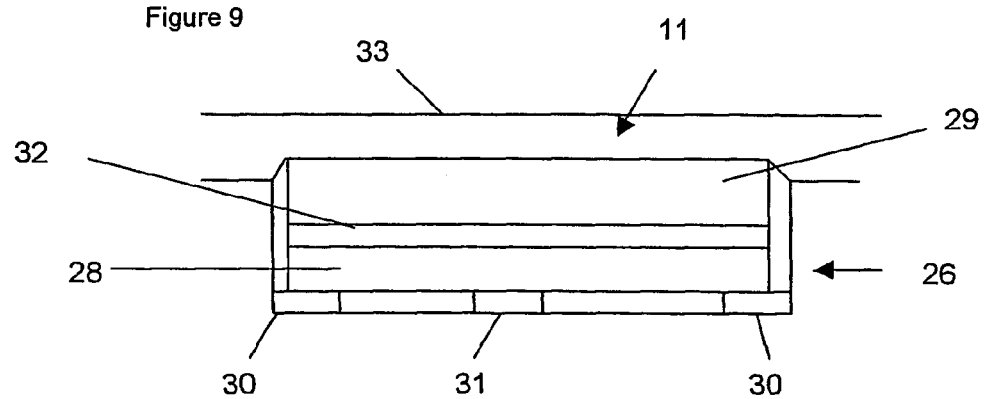
FIG. 9 is a section through a sensing element of FIG. 8.
Figure 10:
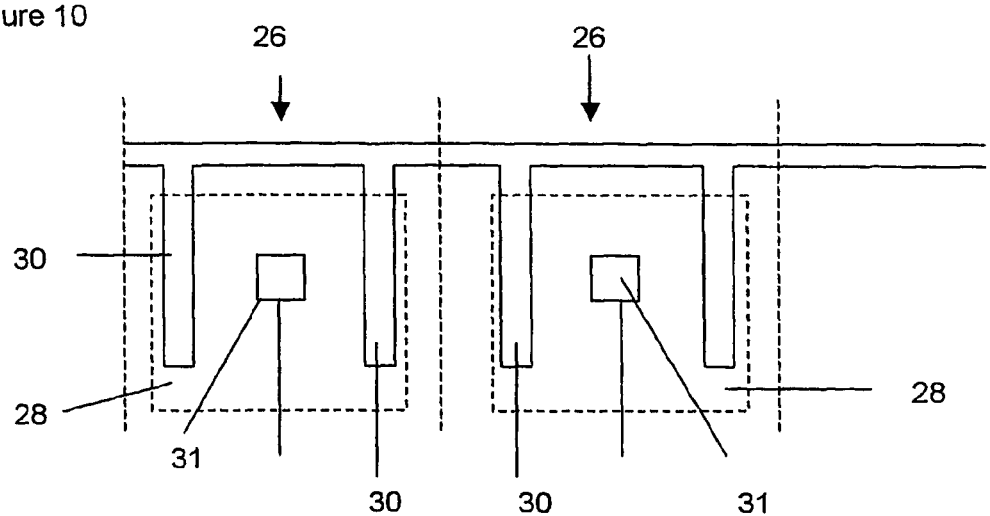
FIG. 10 shows the layout of electrodes in the system of FIGS. 8 and 9.

FIGS. 8 to 10 show in more detail one embodiment of the construction of the measuring sensor 6. As shown in FIG. 8, the individual sensing elements 11 are contained in separate cells 26 of a ladder-type support 27, for example of plastics material. FIG. 9 is a section through one cell 26. It contains a square element of a QTC material 28, above which there is a rigid plunger 29 of e.g. nylon or another suitable material. Beneath the QTC element 28 are the legs 30 of a U shaped ground electrode. Underneath the centre of the QTC element is an individual electrode 31. To improve performance, between the plunger 29 and the QTC element 28 is a thin conductive film 32, such as a copper film adhered to the plunger 29. A protective layer 33, such as a layer of plastics tape, is provided for the sensor.

The outer layer 33 needs to protect the sensors against the environmental conditions and to resist wear, but must also allow transmission of the tyre pressure (ground force) to each sensor element. There must also be no cross-talk, so that the pressure as seen at any one sensor is due to the pressure applied over that sensor's area and is not affected by the pressure applied to an adjacent or near sensor. This may be achieved by making the material relatively thin over or around each sensor element, and relatively thick between them. This can be enhanced by incorporating raised dimples above each sensor element either on the upper, or lower, side of the protective layer 33. This dimple can be shaped to aid transfer of the force and if applied on the underside of the layer 33 over each sensing element could replace the separate load plunger 29.

The electrode arrangement is shown schematically in FIG. 10, which illustrates two adjacent cells 26, and the U-shaped electrodes joined in series to form a common ground.

The electronics 8 are housed in a suitable enclosure near or between the sensor sets, and close to the measuring strip sensor so as to reduce wire runs in view of the number of sensing elements 11. The electronics enclosure should be suitably protected form the environment and will designed to suit the installation conditions.

FIG. 11 shows an alternative embodiment of a sensor for use as the high resolution measuring sensor 6. This particular sensor comprises a single strip 34 of a QTC material. Each individual sensing elements is defined by one (for example indicated at 35) of a line of 128 electrodes 36 on one side of the strip of pressure sensitive material, defined by tracks on a printed circuit board, a corresponding one (for example indicated at 37) of a line of 128 electrodes 38 on the other side, again defined by tracks on the printed circuit board, and a portion (for example indicated at 39) of the QTC strip 34. Above each sensing element QTC portion, such as 39, is provided a force transmittal element 40 for transmitting force from a tyre passing over the sensor, to the QTC portion. In this particular case, each QTC portion is about 4 mm square, and each element 40 is about 1 mm wide and about 4 mm long (in the direction of the width of the QTC strip 34). As an element presses down on its QTC portion, the conductivity is increased. Because the element 40 is only 1 mm wide, the separation between the active parts of the QTC portions is significant, and crosstalk is reduced significantly or eliminated. Furthermore, in practice the QTC material either side of the element 40 is pushed up, isolating the compressed area and possibly also contributing to there being insignificant crosstalk.

Other sizes of QTC portions 39 and transmittal elements 40 may be used, but in the preferred embodiment the width of the elongate element 40 is significantly less than the longitudinal extend of the portion 39, for example being between 20% to 50% and in this particular embodiment about 25%. The force transmittal element 40 preferably extends across a major part of the QTC strip, and most preferably across the entire strip. The element 40 preferably extends slightly beyond each side of the strip, and thus in the present embodiment the length of each element 40 is slightly in excess of 4 mm. This reduces the possibility of edge effects at the ends of the elongate elements, and helps to ensure that the QTC material is evenly compressed across its width.

Figure 13:
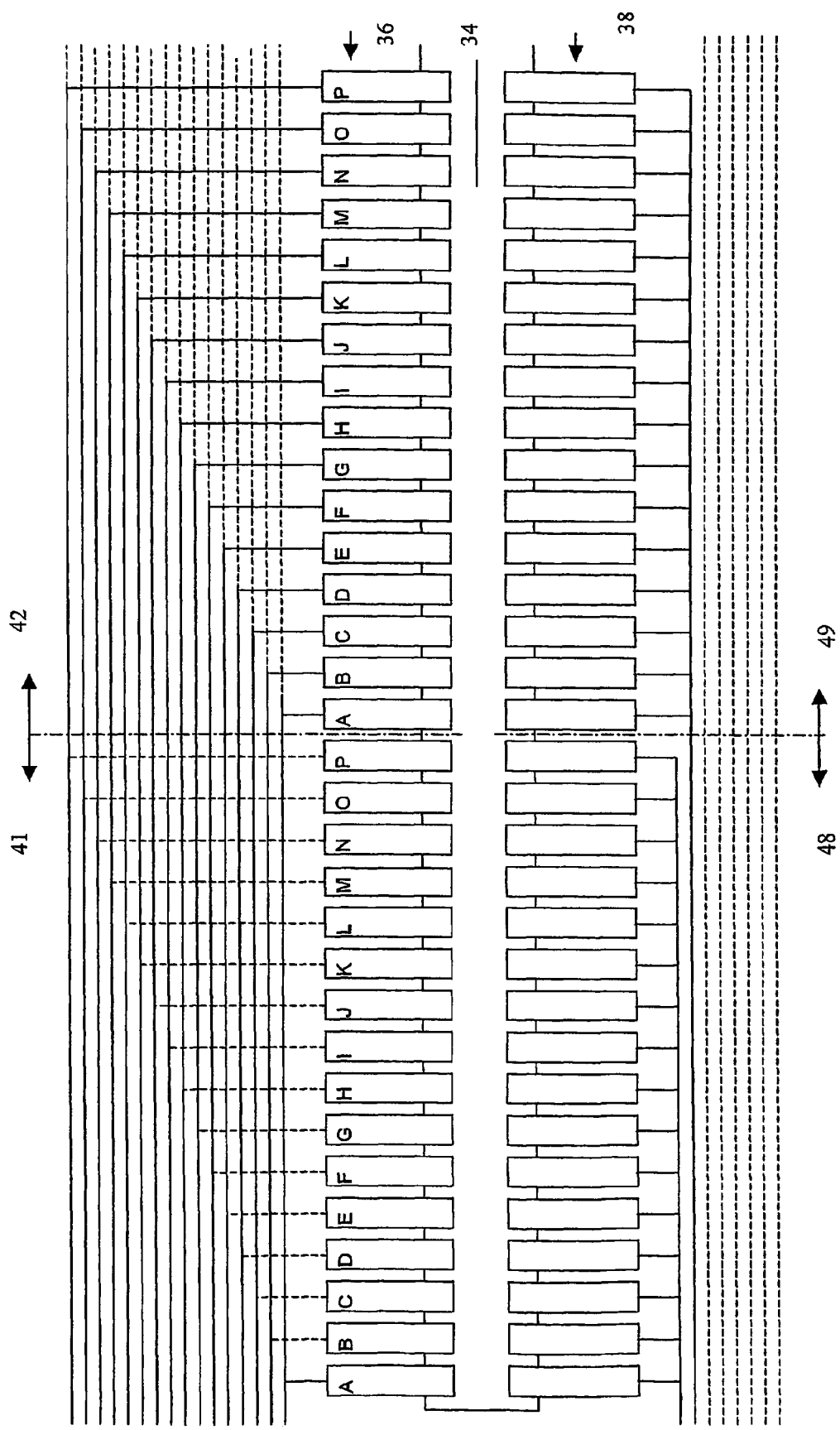
FIG. 13 is a detailed view of part of the electrode arrangement.

FIG. 12 shows the arrangement of the electrodes. The bank 36 of electrodes is divided into 8 groups, 41 to 48, of 16 electrodes A to P, two of which groups 41 and 42 are shown in detail in FIG. 13. The first electrodes (41A and 42A for example) of each group are connected together, as are the B electrodes, the C electrodes and so forth. The opposing bank of electrodes 38 is likewise divided into 8 groups of 16 electrodes, 49 to 56, the electrodes in each group all being joined together as shown in detail in FIG. 13 for groups 48 and 49. There are thus 24 connections to the circuit board.

By connecting to group 48 and cycling through the A to P connections, all of the first 16 cells can be sampled. Then by connecting to group 49 and cycling through the A to P connections again, all of the next 16 cells will be sampled. Typically the sampling frequency may be 100 Hz to 400 Hz or more.

It will be appreciated that such an arrangement of electrodes could be used in the context of the embodiments described earlier.

Figure 14:
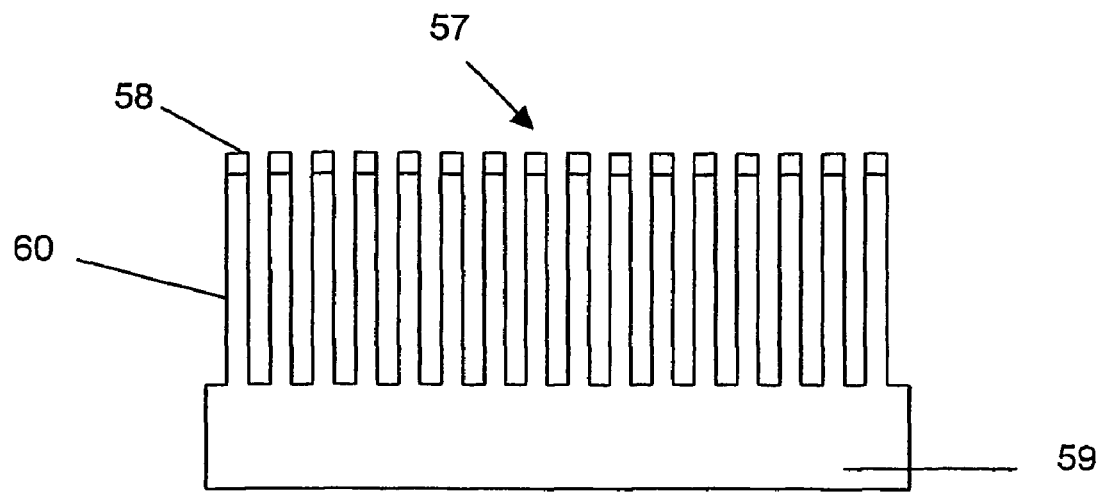
FIG. 14 is a plan view of a block with pressure transmitting elements.
Figure 15:
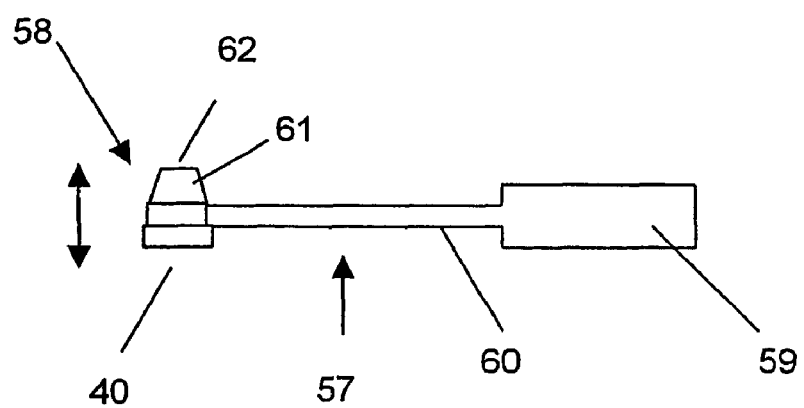
FIG. 15 is a side view of the block.

As shown in FIGS. 14 and 15, a number of hammers 57 with heads 58 are provided by a single metal block 59 with parallel resilient fingers 60. A plastic block would also be possible. Each head 58 has a lower portion forming an elongate force transmittal element 40, and an upper portion 61 which in this particular case is in the form of a truncated pyramid or cone, providing a tyre contacting surface 62. This surface may for example be 3 mm or 4 mm square or any other desired size. The surface 62 will contact a tyre via a protective covering (not shown) which is provided over them, such as covering 33 as described earlier. The portions 40 engage the QTC sensing element of the associated cells, as described above. Depending on whether there is contact or not, the resilient fingers 60 flex so that the elements 40 press down on their sensing elements. The software will, if necessary, take into account the different contact areas of surface 62 and element 40 to provide the desired data.

There could be a single block 59 for all cells in the sensor, or for example a number of blocks each handling, say, 16 or more cells. It will be appreciated that a similar arrangement could be used in modifications of the embodiments described earlier.

It will be appreciated that such an arrangement for providing force transmitting elements could also be used in embodiments using discrete elements of pressure sensitive material rather than a continuous strip. In such a case the force transmittal element could be e.g. square and cover up to the full area of the pressure sensitive material, as there will be no crosstalk problems.

It will also be appreciated that in some circumstances pressure sensing elements will need to be electrically insulated form at least some other components of a sensor, if their electrical properties vary and are to be detected. For example, QTC or other elements could be mounted on an insulating, e.g. plastics, support, or there could be a conductive, e.g. metallic, support provided with an insulating layer where necessary. In embodiments with metallic force transmittal elements, there may be an insulating layer between these elements and the pressure sensitive layer. Thus, elements 40 may contact the QTC strip via an insulating layer, for example.

Various modifications to the embodiments may be made. For example, in the embodiment of FIG. 1, the high resolution sensor 6 could be replaced by a lower resolution sensor able only to determine tyre pressure. This could be done simply by scaling up the individual sensing elements. The sensor 7', and subsequent sensors 7, can be used to determine tyre tread coverage by measuring the total force and thus determining the contact area, as described earlier.

The invention claimed is:

1. A method for measuring characteristics of a tyre on a vehicle wheel, comprising:
   (a) moving the vehicle in a longitudinal direction so that the tyre passes over a laterally extending first measuring sensor comprising an array of individual force sensing elements which provide outputs related to contact pressure at points in a footprint of the tyre as the tyre passes over the first measuring sensor, the force sensing elements of the first measuring sensor being arranged laterally at positions across the width of the tyre as it passes over the first measuring sensor and being of sufficiently high resolution to detect positions within the tyre footprint where there is no contact between the tyre and the first measuring sensor as a result of there being a tread pattern in the surface of the tyre;
   (b) detecting the speed of the tyre in the longitudinal direction as it passes over the first measuring sensor;
   (c) sampling the outputs from the force sensing elements of the first measuring sensor at intervals as the tyre passes over, so as to provide pressure data representing the contact pressure at a number of points distributed laterally across and longitudinally along the tyre footprint that passes over the first measuring sensor; and
   (d) processing the pressure data representing the contact pressure and data representing the speed of the tyre in the longitudinal direction, to provide an indication representative of the extent of tread coverage over the tyre footprint that passes over the first measuring sensor.

2. A method as claimed in claim 1, comprising determining the area of the tyre footprint that passes over the first measuring sensor and, within the footprint of the tyre, the area of contact of the tyre with the first measuring sensor.

3. A method as claimed claim 1, wherein the data is processed so as to provide an indication of the weight borne by the tyre as it passes over the measuring sensor.

4. A method as claimed in claim 1, wherein the data is processed so as to provide an indication representative of the tyre pressure.

5. A method as claimed in claim 1, wherein there is provided a laterally extending detecting sensor spaced from the first measuring sensor in the longitudinal direction; the method comprising detecting the time difference between the tyre contacting the detecting sensor and contacting the first measuring sensor to provide data representing the speed of movement of the tyre in the longitudinal direction.

6. A method as claimed in claim 1, wherein there is provided a laterally extending second measuring sensor spaced from the first measuring sensor in the longitudinal direction, to provide data representative of the extent of tread coverage over the footprint of the tyre at a portion of the tyre circumference spaced form the portion of the tyre circumference that has passed over the first measuring sensor.

7. A method as claimed in claim 6, wherein the second measuring sensor comprises an array of individual force sensing elements which provide outputs related to contact pressure at points on the tyre as it passes over the second measuring sensor, the force sensing elements of the second measuring sensor being arranged laterally at positions across the width of the tyre as it passes over the second measuring sensor and being of sufficiently high resolution to detect positions within the tyre footprint where there is no contact between the tyre and the second measuring sensor as a result of there being a tread pattern in the surface of the tyre.

8. A method as claimed in claim 6, wherein the second measuring sensor has one or more force sensing elements which are of relatively low resolution compared to the resolution of the force sensing elements of the first measuring sensor.

9. A method as claimed in claim 8, wherein the second lateral sensor is a single strip of pressure sensing material extending across the tyre.

10. A method as claimed in claim 8, wherein there is provided adjacent the first measuring sensor, a laterally extending comparison sensor which is of substantially the same construction as the second measuring sensor.

11. A method as claimed in claim 6, wherein there are provided further laterally extending measuring sensors which are of substantially the same construction as the second measuring sensor, and which are spaced from the first and second measuring sensors and from each other in the longitudinal direction, so as to provide an indication representative of the extent of tread coverage over the footprint of the tyre at further portions around the tyre circumference.

12. A method as claimed in claim 1, wherein resilient portions are provided over the force sensing elements of the first measuring sensor, the resilient portions extending into tyre tread portions and, in the case of a tread portion that is below a predetermined minimum tread depth, engaging the base of the tread portion so as to increase the detected area of contact between the tyre and the first measuring sensor, the pressure data representing the contact pressure being processed so as to provide an indication if there is insufficient tread depth on the tyre.

13. Apparatus for measuring characteristics of a tyre on a vehicle wheel whilst moving the vehicle in a longitudinal direction, comprising:
   (a) a laterally extending first measuring sensor arranged so that the tyre will pass over the first measuring sensor, the first measuring sensor comprising an array of individual force sensing elements arranged to provide outputs related to contact pressure at points on a footprint of the tyre as the tyre as it passes over the first measuring sensor, the force sensing elements of the first measuring sensor being arranged laterally at positions across the width of the first measuring sensor and being of sufficiently high resolution to detect, as a tyre passes over the first measuring sensor, positions within the tyre footprint where there is no contact between the tyre and the first measuring sensor as a result of there being a tread pattern in the surface of the tyre;
   (b) a speed detecting system for detecting the speed of the tyre in the longitudinal direction as it passes over the first measuring sensor;
   (c) means for sampling the outputs from the force sensing elements of the first measuring sensor at intervals as the tyre passes over, so as to provide pressure data representing the contact pressure at a number of points distributed laterally across and longitudinally along the whole of the tyre footprint that passes over the first measuring sensor; and
   (d) means for processing the pressure data representing the contact pressure and data representing the speed of the tyre in the longitudinal direction, to provide an indication representative of the extent of tread coverage over the tyre footprint that passes over the first measuring sensor.

14. Apparatus as claimed in claim 13, configured to determine the area of the tyre footprint that passes over the first measuring sensor and, within the footprint of the tyre, the area of contact of the tyre with the first measuring sensor.

15. Apparatus as claimed in claim 13, wherein there is provided a laterally extending detecting sensor spaced from the first measuring sensor in the longitudinal direction; and means for detecting the time difference between the tyre contacting the detecting sensor and contacting the first measuring sensor to provide data representing the speed of movement of the tyre in the longitudinal direction.

16. Apparatus as claimed in claim 13, wherein there is provided a laterally extending second measuring sensor spaced from the first measuring sensor in the longitudinal direction, to provide data representative of the extent of tread coverage over the footprint of the tyre at a portion of the tyre circumference spaced form the portion of the tyre circumference that has passed over the first measuring sensor.

17. Apparatus as claimed in claim 16, wherein the second measuring sensor comprises an array of individual force sensing elements which provide outputs related to contact pressure at points on the tyre as it passes over the second measuring sensor, the force sensing elements of the second measuring sensor being arranged laterally at positions across the width of the tyre as it passes over the second measuring sensor and being of sufficiently high resolution to detect positions within the tyre footprint where there is no contact between the tyre and the second measuring sensor as a result of there being a tread pattern in the surface of the tyre.

18. Apparatus as claimed in claim 16, wherein the second measuring sensor has one or more force sensing elements which are of relatively low resolution compared to the resolution of the force sensing elements of the first measuring sensor.

19. Apparatus as claimed in claim 18, wherein the second lateral sensor is a single strip of pressure sensing material extending across the tyre.

20. Apparatus as claimed in claim 17, wherein there is provided adjacent the first measuring sensor, a laterally extending comparison sensor which is of substantially the same construction as the second measuring sensor.

21. Apparatus as claimed in claim 18, wherein there are provided further laterally extending measuring sensors which are of substantially the same construction as the second measuring sensor, and which are spaced from the first and second measuring sensors and from each other in the longitudinal direction, so as to provide an indication representative of the extent of tread coverage over the footprint of the tyre at further portions around the tyre circumference.

22. Apparatus as claimed in claim 13, wherein resilient portions are provided over the force sensing elements of the first measuring sensor, the resilient portions extending into tyre tread portions and, in the case of a tread portion that is below a predetermined minimum tread depth, engaging the base of the tread portion so as to increase the detected area of contact between the tyre and the first measuring sensor, the pressure data representing the contact pressure being processed so as to provide an indication if there is insufficient tread depth on the tyre.

* * * * *